US012651790B2

(12) United States Patent
Kim

(10) Patent No.: US 12,651,790 B2
(45) Date of Patent: Jun. 9, 2026

(54) RECHARGEABLE BATTERY

(71) Applicant: SAMSUNG SDI CO., LTD., Yongin-si (KR)

(72) Inventor: Dae Kyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 490 days.

(21) Appl. No.: 17/754,014

(22) PCT Filed: Mar. 9, 2021

(86) PCT No.: PCT/KR2021/002866
§ 371 (c)(1),
(2) Date: Mar. 21, 2022

(87) PCT Pub. No.: WO2021/261706
PCT Pub. Date: Dec. 30, 2021

(65) Prior Publication Data
US 2022/0336897 A1      Oct. 20, 2022

(30) Foreign Application Priority Data

Jun. 23, 2020    (KR) ........................ 10-2020-0076594

(51) Int. Cl.
*H01M 50/166*        (2021.01)
*H01M 10/04*         (2006.01)
(Continued)

(52) U.S. Cl.
CPC ..... *H01M 50/166* (2021.01); *H01M 10/0427* (2013.01); *H01M 50/109* (2021.01);
(Continued)

(58) Field of Classification Search
CPC ............. H01M 50/153; H01M 50/171; H01M 50/181; H01M 50/188; H01M 50/166;
(Continued)

(56) References Cited

U.S. PATENT DOCUMENTS 4,487,819 A * 12/1984 Koga ...................... H01M 6/12
                                                              429/174
5,846,672 A * 12/1998 Bennett ............... H01M 50/109
                                                              429/174
(Continued)

FOREIGN PATENT DOCUMENTS

KR        10-1373218 B1      3/2014
KR     10-2019-0010566 A     1/2019
(Continued)

OTHER PUBLICATIONS

International Search Report of PCT/KR2021/002866, Jun. 21, 2021, 6 pages.

*Primary Examiner* — Jessie Walls-Murray
(74) *Attorney, Agent, or Firm* — Womble Bond Dickinson (US) LLP

(57)        ABSTRACT

A rechargeable battery includes: an electrode assembly including a first electrode, a second electrode, and a separator disposed between the first electrode and the second electrode; a case that is connected to the first electrode to accommodate the electrode assembly, and includes an opening exposing the electrode assembly and a first side wall forming the opening; a cap plate that is coupled to the case to cover an outer area of the opening, and includes a through-hole exposing a central area of the opening and a second side wall overlapping the first side wall in a horizontal direction; a terminal plate that is connected to the second electrode to be insulation-bonded to the cap plate and covers the through-hole; and a first bonding layer that is positioned between the first side wall of the case and the second side wall of the cap plate, and bonds the first side wall and the second side wall.

10 Claims, 4 Drawing Sheets

(51) Int. Cl.

| | |
|---|---|
| *H01M 50/109* | (2021.01) |
| *H01M 50/153* | (2021.01) |
| *H01M 50/171* | (2021.01) |
| *H01M 50/172* | (2021.01) |
| *H01M 50/181* | (2021.01) |
| *H01M 50/188* | (2021.01) |
| *H01M 50/528* | (2021.01) |
| *H01M 50/531* | (2021.01) |
| *H01M 50/545* | (2021.01) |
| *H01M 50/559* | (2021.01) |
| *H01M 50/56* | (2021.01) |
| *H01M 50/564* | (2021.01) |

(52) U.S. Cl.
CPC ....... *H01M 50/153* (2021.01); *H01M 50/171* (2021.01); *H01M 50/172* (2021.01); *H01M 50/181* (2021.01); *H01M 50/188* (2021.01); *H01M 50/528* (2021.01); *H01M 50/531* (2021.01); *H01M 50/545* (2021.01); *H01M 50/559* (2021.01); *H01M 50/56* (2021.01); *H01M 50/564* (2021.01)

(58) Field of Classification Search
CPC ........... H01M 10/0427; H01M 50/109; H01M 50/559; H01M 50/545; H01M 50/56; H01M 50/172; H01M 50/154; H01M 50/183; H01M 50/198
See application file for complete search history.

(56) References Cited

U.S. PATENT DOCUMENTS

| | | | |
|---|---|---|---|
| 2013/0216881 A1* | 8/2013 | Gaugler ............ | H01M 10/4235 |
| | | | 429/162 |
| 2015/0221925 A1 | 8/2015 | Kim et al. | |
| 2017/0207491 A1* | 7/2017 | Tamachi ............. | H01M 50/107 |
| 2020/0083499 A1 | 3/2020 | Reinauer | |
| 2021/0111454 A1 | 4/2021 | Zhu et al. | |
| 2021/0328290 A1* | 10/2021 | Lee ................... | H01M 10/0427 |
| 2021/0408650 A1* | 12/2021 | Guo ................... | H01M 50/586 |
| 2023/0045132 A1* | 2/2023 | Lim ................... | H01M 50/586 |

FOREIGN PATENT DOCUMENTS

| | | |
|---|---|---|
| KR | 10-2020-0007559 A | 1/2020 |
| KR | 10-2020-0020619 A | 2/2020 |
| WO | WO 2020-057127 A1 | 3/2020 |

\* cited by examiner

RECHARGEABLE BATTERY

CROSS-REFERENCE TO RELATED APPLICATION(S)

This application is a U.S. National Phase Patent Application of International Application Number PCT/KR2021/002866, filed on Mar. 9, 2021, which claims priority of Korean Patent Application Number 10-2020-0076594, filed on Jun. 23, 2020, the entire content of each of which is incorporated herein by reference.

TECHNICAL FIELD

The present disclosure relates to a rechargeable battery.

BACKGROUND ART

Generally, a rechargeable battery is a battery that may be repeatedly charged and discharged.

Recently, as the demand for wearable devices such as headphones, earphones, smartwatches, and body-attached medical devices, and the use of wireless communication such as Bluetooth increases, the need for ultra-small rechargeable batteries to be mounted on the wearable devices is increasing.

Such an ultra-small rechargeable battery is required to seal and preserve an electrode assembly and an electrolyte solution positioned therein.

DISCLOSURE

Technical Problem

An embodiment is to provide a rechargeable battery with improved seal preservation ability for an electrode assembly positioned therein.

Technical Solution

An aspect provides a rechargeable battery including: an electrode assembly including a first electrode, a second electrode, and a separator disposed between the first electrode and the second electrode; a case that is connected to the first electrode to accommodate the electrode assembly, and includes an opening exposing the electrode assembly and a first side wall forming the opening; a cap plate that is coupled to the case to cover an outer area of the opening, and includes a through-hole exposing a central area of the opening and a second side wall overlapping the first side wall in a horizontal direction; a terminal plate that is connected to the second electrode to be insulation-bonded to the cap plate and covers the through-hole; and a first bonding layer that is positioned between the first side wall of the case and the second side wall of the cap plate, and bonds the first side wall and the second side wall.

The second side wall may cover the first side wall in the horizontal direction.

A length of the first side wall may be longer than that of the second side wall.

A width in the horizontal direction of a first portion of the first side wall overlapping the second side wall in the horizontal direction may be narrower than a width in the horizontal direction of a second portion of the first side wall that does not overlap the second side wall in the horizontal direction.

The first portion of the first side wall may be in contact with the cap plate.

An edge of the second portion of the first side wall and an edge of the second side wall may be positioned on the same vertical line.

The first side wall may cover the second side wall in the horizontal direction.

A length of the second side wall may be longer than that of the first side wall.

A width in the horizontal direction of a third portion of the second side wall overlapping the first side wall in the horizontal direction may be narrower than a width in the horizontal direction of a fourth portion of the second side wall that does not overlap the first side wall in the horizontal direction.

The third portion of the second side wall may contact the case.

An edge of the fourth portion of the second side wall and an edge of the first side wall may be positioned on the same vertical line.

The terminal plate may include a flange portion positioned on the cap plate to cover the through-hole, and a protrusion passing through the through-hole from the flange portion.

The rechargeable battery may further include a second bonding layer positioned between the cap plate and the flange portion and insulation-bonding the cap plate and the flange portion.

The electrode assembly may further include a first electrode tab extending from the first electrode to be coupled to the case, and a second electrode tab extending from the second electrode to be coupled to the protrusion of the terminal plate.

The case and the cap plate may have the same polarity as the first electrode, and the terminal plate may have the same polarity as the second electrode.

The first bonding layer may be bonded by thermal fusion.

Advantageous Effects

According to the embodiment, a rechargeable battery with improved seal preservation ability for an electrode assembly positioned therein is provided.

DESCRIPTION OF THE DRAWINGS

FIG. 2 illustrates a cross-sectional view taken along line II-II of FIG. 1.

MODE FOR INVENTION

The present invention will be described more fully hereinafter with reference to the accompanying drawings, in which embodiments of the invention are shown. As those skilled in the art would realize, the described embodiment may be modified in various different ways, all without departing from the spirit or scope of the present invention.

In addition, unless explicitly described to the contrary, the word "comprise", and variations such as "comprises" or "comprising" will be understood to imply the inclusion of stated elements but not the exclusion of any other elements.

Hereinafter, a rechargeable battery according to an embodiment will be described with reference to FIG. 1 and FIG. 2.

The rechargeable battery according to the embodiment is an ultra-small rechargeable battery, and may include a coin cell or a button cell, but the present invention is not limited thereto, and it may include a cylindrical or pin-type cell.

Here, the coin cell or the button cell is a thin coin-type or button-type cell, and may mean a battery having a ratio (height/diameter) of a height to a diameter of 1 or less, but is not limited thereto. Since the coin cell or the button cell is mainly cylindrical, a horizontal cross-section is circular, but the present invention is not limited thereto, and a horizontal cross-section may be oval or polygonal. In this case, the diameter may mean a maximum distance of the cell based on a horizontal direction of the cell, and the height may mean a maximum distance (distance from a flat bottom surface thereof to a flat uppermost surface) of the cell based on a vertical direction of the cell.

Figure 1:
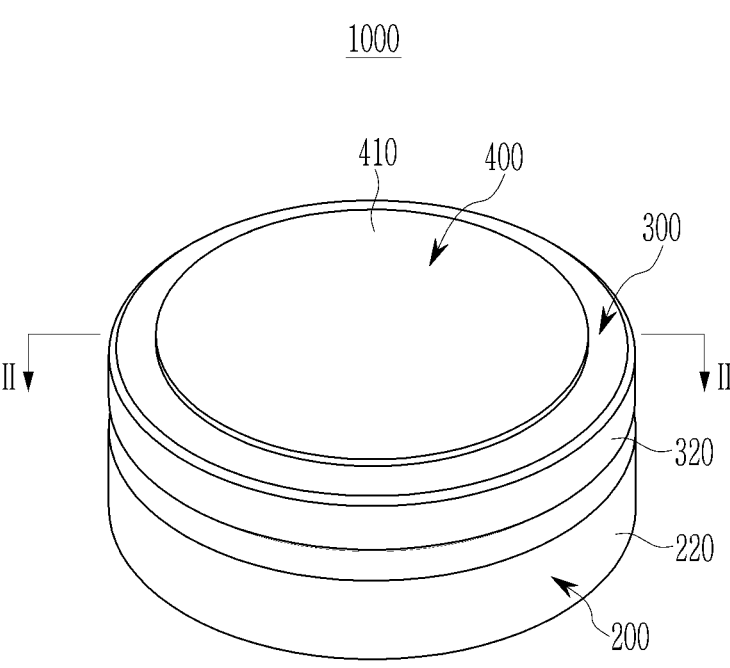
FIG. 1 illustrates a perspective view of a rechargeable battery according to an embodiment.

FIG. 1 illustrates a perspective view of a rechargeable battery according to an embodiment. FIG. 2 illustrates a cross-sectional view taken along line II-II of FIG. 1.

Figure 2:
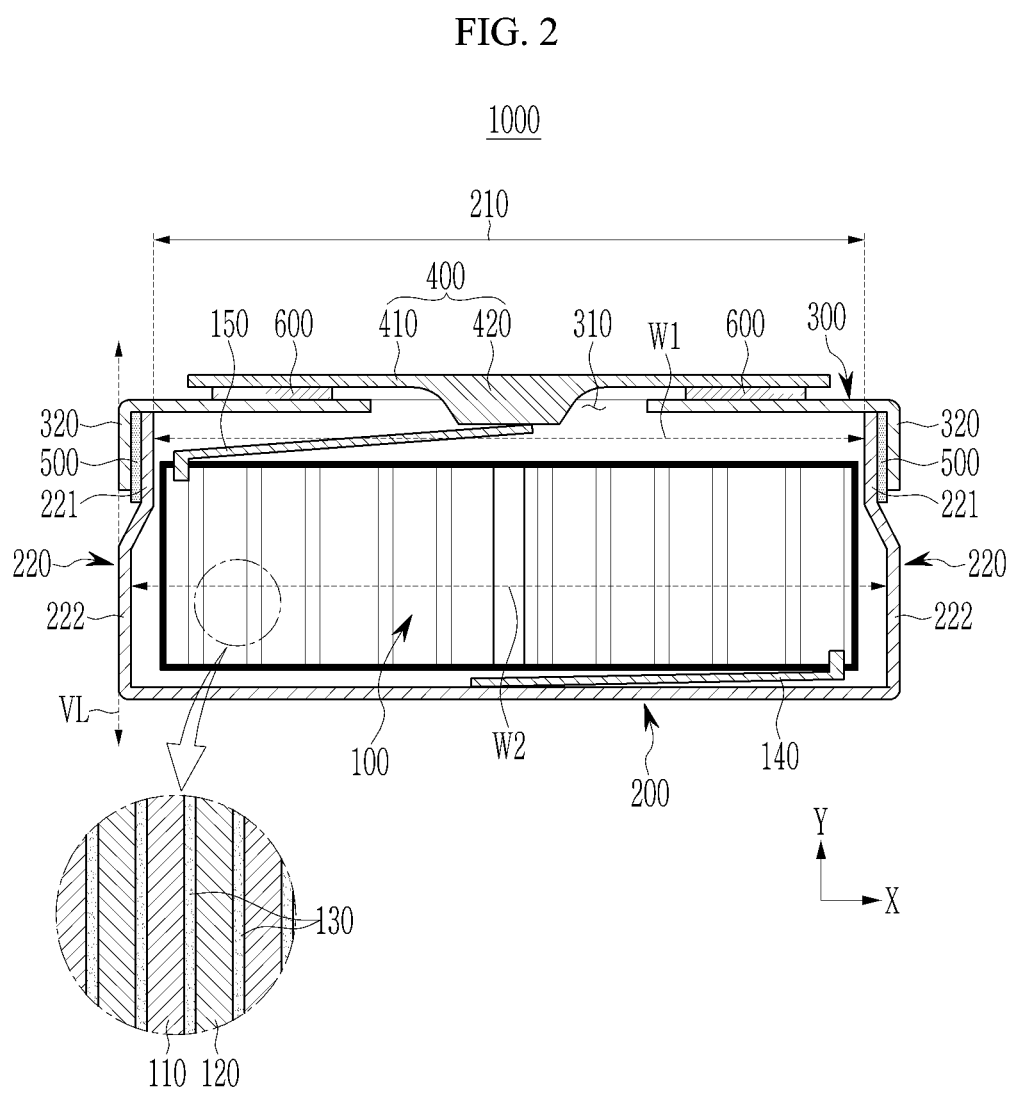

Referring to FIG. 1 and FIG. 2, a rechargeable battery 1000 according to an embodiment includes an electrode assembly 100, a case 200, a cap plate 300, a terminal plate 400, a first bonding layer 500, and a second bonding layer 600.

The electrode assembly 100 is accommodated in the case 200. A lower portion of the electrode assembly 100 faces a bottom portion of the case 200, and an upper portion of the electrode assembly 100 faces the cap plate 300 covering an opening 210 of the case 200 and the terminal plate 400. The upper and lower portions of the electrode assembly 100 may have planar shapes that are parallel to each other, but are not limited thereto.

The electrode assembly 100 includes a first electrode 110, a second electrode 120, a separator 130, a first electrode tab 140, and a second electrode tab 150.

The first electrode 110 and the second electrode 120 are spaced apart from each other, and the separator 130 including an insulating material is disposed between the first electrode 110 and the second electrode 120. The first electrode 110 may be a negative electrode (anode) and the second electrode 120 may be a positive electrode (cathode), but the present invention is not limited thereto, and the first electrode 110 may be a positive electrode and the second electrode 120 may be a negative electrode.

The first electrode 110 has a shape of a band extending in one direction, and includes a negative electrode coated region that is a region where a negative active material layer is coated to a current collector of a metal foil (for example, a Cu foil) and a negative electrode uncoated region that is a region where an active material is not coated. The negative electrode uncoated region may be disposed at one end portion in an extending direction of the first electrode 110.

The second electrode 120 has a band shape that is spaced apart from the first electrode 110 to extend in one direction with the separator 130 interposed therebetween, and includes a positive electrode coated region that is a region where a positive active material layer is coated to a current collector of a metal foil (for example, an Al foil) and a positive electrode uncoated region that is a region where an active material is not coated. The positive electrode uncoated region may be disposed at one end portion in an extending direction of the second electrode 120.

The separator 130 extends in one direction between the first electrode 110 and the second electrode 120 to prevent a short circuit between the first electrode 110 and the second electrode 120.

The first electrode 110, the separator 130, and the second electrode 120 are sequentially stacked and wound in a jelly roll shape, but are not limited thereto, and may be formed in various known shapes. Each of the first electrode 110, the second electrode 120, and the separator 130 may include various known materials.

The first electrode tab 140 extends from the first electrode 110 of the electrode assembly 100 to the case 200. The first electrode tab 140 is coupled to the bottom portion of the case 200 to connect the first electrode 110 and the case 200. The first electrode tab 140 contacts the first electrode 110 and the case 200. By the first electrode tab 140, the case 200 has the same polarity as that of the first electrode 110.

The second electrode tab 150 extends from the second electrode 120 of the electrode assembly 100 to the terminal plate 400. The second electrode tab 150 is coupled to a protrusion 420 of the terminal plate 400 to connect the second electrode 120 and the terminal plate 400. The second electrode tab 150 contacts the second electrode 120 and the terminal plate 400. By the second electrode tab 150, the terminal plate 400 has the same polarity as that of the second electrode 120.

Meanwhile, a center pin penetrating a center of the electrode assembly 100 in a vertical direction may be positioned at a center portion of the electrode assembly 100, and the center pin may support the first electrode tab 140 and the second electrode tab 150, but is not limited thereto.

The case 200 is coupled to the first electrode 110 of the electrode assembly 100 to house the electrode assembly 100. The bottom portion of the case 200 is connected to the first electrode 110 of the electrode assembly 100 by the first electrode tab 140 to have the same polarity as that of the first electrode 110. The case 200 has a cylinder shape for accommodating the electrode assembly 100 of a jelly roll shape, but is not limited thereto, and may have various known shapes. The case 200 may accommodate various known electrolyte solutions along with the electrode assembly 100. An outer surface of the case 200 may be a first electrode terminal of the rechargeable battery 1000, but is not limited thereto. In this case, an outer surface of a flange portion 410 that is an outer surface of the terminal plate 400 may be a second electrode terminal of the rechargeable battery 1000, but is not limited thereto. Meanwhile, a plating layer may be coated on the outer surface of the case 200, but the present invention is not limited thereto, and various known coating layers may be coated on the outer surface of the case 200. The case 200 includes stainless steel, but is not limited thereto, and may include metal such as aluminum, nickel, and copper. The case 200 includes the opening 210 exposing the upper portion of the electrode assembly 100 and a first side wall 220 forming the opening 210.

The opening 210 of the case 200 is covered by the cap plate 300 and the terminal plate 400.

The first side wall 220 of the case 200 extends in a vertical direction (Y) from an edge of the bottom portion of the case 200 to form the opening 210.

The first side wall 220 of the case 200 overlaps a second side wall 320 of the cap plate 300 in a horizontal direction (X). The first side wall 220 of the case 200 is covered by the second side wall 320 in the horizontal direction (X).

The first side wall 220 of the case 200 includes a first portion 221 and a second portion 222.

The first portion 221 is a portion that overlaps the second side wall 320 in the horizontal direction (X), and the second portion 222 is a portion that extends from the first portion 221 in the vertical direction (Y) and does not overlap the second side wall 320 in the horizontal direction (X). A first width W1 in the horizontal direction (X) of the first portion 221 forming the opening 210 is narrower than a second width W2 in the horizontal direction (X) of the second portion 222. The first portion 221 may be a portion that is plastically deformed from the second portion 222 by using a necking process and the like, but is not limited thereto.

Since the first width W1 of the first portion 221 is narrower than the second width W2 of the second portion 222, the edge of the second portion 222 of the first side wall 220 and the edge of the second side wall 320 of the cap plate 300 are positioned on the same imaginary vertical line VL in the vertical direction (Y).

That is, the outermost edge of the first side wall 220 of the case 200 in the horizontal direction (X) and the outermost edge of the second side wall 320 of the cap plate 300 in the horizontal direction (X) are positioned on the same imaginary vertical line VL, so that interference with other components of a device in which the rechargeable battery 1000 is installed is suppressed by the volume of the rechargeable battery 1000 itself.

A length of the first side wall 220 of the case 200 may be longer in the vertical direction (Y) than a length of the second side wall 320 of the cap plate 300, but is not limited thereto.

An end portion of the first side wall 220 of the case 200 contacts the cap plate 300, and the first side wall 220 of the case 200 contacts the cap plate 300, so that the cap plate 300 has the same polarity as the case 200 and the first electrode 110. The first side wall 220 of the case 200 may simply contact the cap plate 300, but is not limited thereto, and the first side wall 220 of the case 200 may be coupled to the cap plate 300 by welding or the like.

The cap plate 300 is combined with the case 200 to cover an outer area of the opening 210. The cap plate 300 includes a through-hole 310 exposing a central area of the opening 210, and the second side wall 320 overlapping the first side wall 220 of the case 200 in the horizontal direction (X). The cap plate 300 contacts the first side wall 220 of the case 200 forming the opening 210 of the case 200, and the second side wall 320 of the cap plate 300 is coupled to cover the first side wall 220 of the case 200 in the horizontal direction (X) to cover the outer area of the opening 210. The cap plate 300 has a ring shape by the through-hole 310 formed in a central portion thereof, but is not limited thereto. The cap plate 300 is combined with the case 200 to have the same polarity as that of the first electrode 110. The cap plate 300 includes stainless steel, but is not limited thereto, and may include a metal such as aluminum, nickel, and copper. An outer surface of the cap plate 300 may be a first electrode terminal of the rechargeable battery 1000, but is not limited thereto.

Meanwhile, a plating layer may be coated on the outer surface of the cap plate 300, but the present invention is not limited thereto, and various known coating layers may be coated on the outer surface of the cap plate 300.

The second side wall 320 of the cap plate 300 overlaps the first side wall 220 in the horizontal direction (X) to cover the first side wall 220. The second side wall 320 of the cap plate 300 overlaps the first portion 221 of the first side wall 220 of the case 200 in the horizontal direction (X), and does not overlap the second portion 222 of the first side wall 220 in the horizontal direction (X). The edge of the second side wall 320 of the cap plate 300 and the edge of the second portion 222 of the first side wall 220 of the case 200 are positioned on the same imaginary vertical line VL in the vertical direction (Y).

That is, the outermost edge of the second side wall 320 of the cap plate 300 in the horizontal direction (X) and the outermost edge of the first side wall 220 of the case 200 in the horizontal direction (X) are positioned on the same imaginary vertical line VL, so that interference with other components of a device in which the rechargeable battery 1000 is installed is suppressed by the volume of the rechargeable battery 1000 itself.

The length of the second side wall 320 of the cap plate 300 may be shorter in the vertical direction (Y) than the length of the first side wall 220 of the case 200, but is not limited thereto.

The second side wall 320 of the cap plate 300 and the first portion 221 of the first side wall 220 of the case 200 are bonded by the first bonding layer 500, but are not limited thereto, and the second side wall 320 of the cap plate 300 and the first side wall 220 of the case 200 may be bonded by various bonding materials.

The terminal plate 400 is connected to the second electrode 120 to be insulation-bonded to the cap plate 300. The terminal plate 400 covers the through-hole 310 of the cap plate 300. The terminal plate 400 is disposed on the cap plate 300. The terminal plate 400 covers the central area of the opening 210 of the case 200 exposed by the through-hole 310 of the cap plate 300. The terminal plate 400 covers the central area of the opening 210, and the cap plate 300 covers the outer area of the opening 210, thus the opening 210 of the case 200 is completely covered by the terminal plate 400 and the cap plate 300. The terminal plate 400 is connected to the second electrode tab 150 of the electrode assembly 100 to be connected to the second electrode 120 of the electrode assembly 100. The terminal plate 400 has the same polarity as that of the second electrode 120.

The terminal plate 400 includes the flange portion 410 and the protrusion 420.

The flange portion 410 is disposed on the cap plate 300, and overlaps the cap plate 300 to cover the through-hole 310. The flange portion 410 has a larger area than the protrusion 420. For example, the flange portion 410 may have a larger diameter than the protrusion 420. The flange portion 410 has a thinner thickness than the protrusion 420, but is not limited thereto. A lower surface of the flange portion 410 is in contact with the second bonding layer 600, and the flange portion 410 is insulation-bonded to the cap plate 300 by the second bonding layer 600. The outer surface of the flange portion 410 may be the second electrode terminal of the rechargeable battery 1000.

The protrusion 420 protrudes from the flange portion 410 to penetrate the through-hole 310. The protrusion 420 passes through the through-hole 310 from the flange portion 410 to be connected to the second electrode 120. A lower surface of the protrusion 420 is in contact with the second electrode tab 150. As the protrusion 420 is coupled with the second electrode tab 150, the protrusion 420 and the flange portion 410 of the terminal plate 400 have the same polarity as that of the second electrode 120.

The protrusion 420 and the flange portion 410 are integrally formed, but are not limited thereto, and different materials may be combined to form the terminal plate 400.

A plating layer may be coated on the outer surface of the terminal plate 400, but the present invention is not limited thereto, and various known coating layers may be coated on the outer surface of the terminal plate 400.

Meanwhile, in another exemplary embodiment, the flange portion 410 of the terminal plate 400 may be positioned between the cap plate 300 and the electrode assembly 100, and the protrusion 420 thereof may extend from the flange portion 410 and pass through the through-hole 310. In this case, the lower surface of the flange portion 410 may be coupled to the second electrode tab 150 of the electrode assembly 100.

In another embodiment, the terminal plate 400 may include only the flange portion 410 positioned on the cap plate 300. In this case, the second electrode tab 150 of the electrode assembly 100 may be coupled to the lower surface of the flange portion 410 through the through-hole 310 of the cap plate 300.

The first bonding layer 500 bonds the case 200 and the cap plate 300. The first bonding layer 500 is positioned between the first portion 221 of the first side wall 220 of the case 200 and the second side wall 320 of the cap plate 300, and bonds the first side wall 220 and the second side wall 320. The first bonding layer 500 may include an insulating material, but is not limited thereto, and may include a conductive material. The first bonding layer 500 may be bonded between the first side wall 220 of the case 200 and the second side wall 320 of the cap plate 300 by thermal fusion using heat or a laser beam, but is not limited thereto. The first bonding layer 500 may include various known bonding materials for bonding the first side wall 220 of the case 200 and the second side wall 320 of the cap plate 300.

The first bonding layer 500 is cured by heat, but may be melted at a predetermined temperature. Here, the predetermined temperature at which the first bonding layer 500 melts may be a temperature exceeding a temperature of heat for curing the first bonding layer 500, but is not limited thereto.

For example, the first bonding layer 500 may include a thermosetting resin and a thermoplastic resin. The thermosetting resin and the thermoplastic resin of the first bonding layer 500 may be stacked in a plurality of layers, but are not limited thereto. The thermosetting resin of the first bonding layer 500 is cured by heat, and may include various known thermosetting resins such as a phenol resin, a urea resin, a melamine resin, an epoxy resin, and a polyester resin. The thermoplastic resin of the first bonding layer 500 includes a polypropylene resin that melts at a predetermined temperature, but is not limited thereto, and it may include various known thermoplastic resins such as polystyrene, polyethylene, and polyvinyl chloride resins.

The second bonding layer 600 is disposed between the cap plate 300 and the flange portion 410 of the terminal plate 400, and insulation-bonds the cap plate 300 and the flange portion 410 of the terminal plate 400. The second bonding layer 600 contains an insulating material, and insulates between the cap plate 300 and the terminal plate 400. The second bonding layer 600 may be bonded between the cap plate 300 and the flange portion 410 of the terminal plate 400 by thermal fusion using heat or a laser beam, but is not limited thereto. The second bonding layer 600 may include various known materials that insulation-bond the cap plate 300 and the terminal plate 400. The second bonding layer 600 bonds the cap plate 300 and the terminal plate 400, and the first bonding layer 500 bonds the case 200 and the cap plate 300, so that the opening 210 of the case 200 accommodating the electrode assembly 100 is completely sealed by the cap plate 300, the terminal plate 400, the first bonding layer 500, and the second bonding layer 600.

The second bonding layer 600 is cured by heat, but may be melted at a predetermined temperature. Here, the predetermined temperature at which the second bonding layer 600 melts may be a temperature exceeding a temperature of heat for curing the second bonding layer 600, but is not limited thereto.

For example, the second bonding layer 600 may include a thermosetting resin and a thermoplastic resin. The thermosetting resin and the thermoplastic resin of the second bonding layer 600 may be stacked in a plurality of layers, but are not limited thereto. The thermosetting resin of the second bonding layer 600 is cured by heat, and may include various known thermosetting resins such as a phenol resin, a urea resin, a melamine resin, an epoxy resin, and a polyester resin. The thermoplastic resin of the second bonding layer 600 includes a polypropylene resin that melts at a predetermined temperature, but is not limited thereto, and it may include various known thermoplastic resins such as polystyrene, polyethylene, and polyvinyl chloride resins.

As described above, in the rechargeable battery 1000 according to the embodiment, the first side wall 220 of the case 200 in which the electrode assembly 100 is accommodated overlaps the second side wall 320 of the cap plate 300 covering the outer area of the opening 210 in the horizontal direction (X), the first side wall 220 and the second side wall 320 are bonded by the first bonding layer 500, and the central area of the opening 210 is covered by the terminal plate 400 bonded to the cap plate 300, so that the opening 210 of the case 200 in which the electrode assembly 100 is accommodated is completely sealed by the cap plate 300, the terminal plate 400, the first bonding layer 500, and the second bonding layer 600, thus the close and seal preservation ability for the electrode assembly 100 and the electrolyte positioned inside the case 200 is improved.

That is, the rechargeable battery 1000 with improved close and seal preservation ability for the electrode assembly positioned therein is provided.

Hereinafter, a rechargeable battery 1002 according to another embodiment will be described with reference to FIG. 3 and FIG. 4. Hereinafter, elements different from those of the rechargeable battery according to the above-described embodiment will be described.

Figure 3:
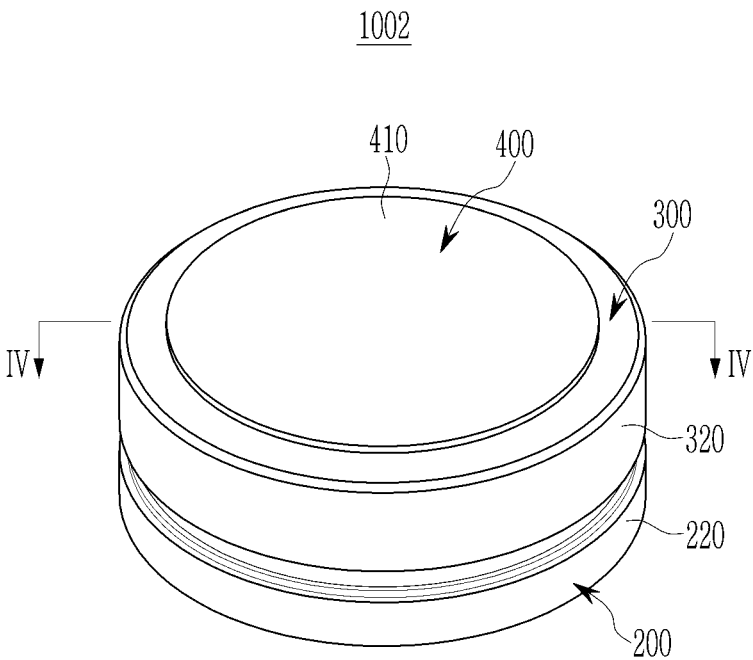
FIG. 3 illustrates a perspective view of a rechargeable battery according to another embodiment.

FIG. 3 illustrates a perspective view of a rechargeable battery according to another embodiment. FIG. 4 illustrates a cross-sectional view taken along line IV-IV of FIG. 3.

Figure 4:
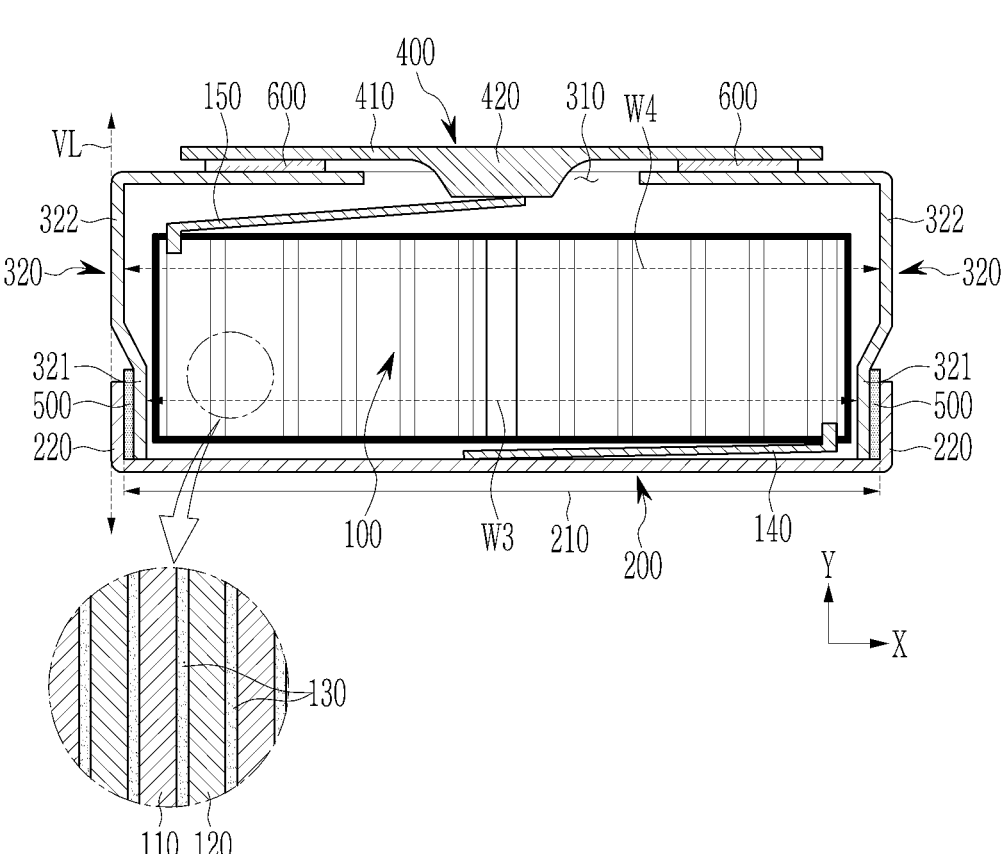
FIG. 4 illustrates a cross-sectional view taken along line IV-IV of FIG. 3.

Referring to FIG. 3 and FIG. 4, a rechargeable battery 1002 according to another embodiment includes an electrode assembly 100, a case 200, a cap plate 300, a terminal plate 400, a first bonding layer 500, and a second bonding layer 600.

The case 200 includes the opening 210 exposing the upper portion of the electrode assembly 100 and a first side wall 220 forming the opening 210.

The opening 210 of the case 200 is covered by the cap plate 300 and the terminal plate 400. The first side wall 220 of the case 200 extends in a vertical direction (Y) from an edge of the bottom portion of the case 200 to form the opening 210.

The first side wall 220 of the case 200 overlaps a second side wall 320 of the cap plate 300 in a horizontal direction (X). The first side wall 220 of the case 200 covers the second side wall 320 of the cap plate 300 in the horizontal direction (X).

The second side wall 320 of the cap plate 300 includes a third portion 321 and a fourth portion 322.

The third portion 321 of the second side wall 320 of the cap plate 300 is a portion that overlaps the first side wall 220 in the horizontal direction (X), and the fourth portion 322 is a portion that extends from the third portion 321 in the vertical direction (Y) and does not overlap the first side wall 220 in the horizontal direction (X). A third width W3 in the horizontal direction (X) of the third portion 321 of the second side wall 320 is narrower than a fourth width W4 in the horizontal direction (X) of the fourth portion 322 thereof. The third portion 321 may be a portion that is plastically deformed from the fourth portion 322 by using a necking process and the like, but is not limited thereto.

Since the third width W3 of the third portion 321 of the second side wall 320 of the cap plate 300 is narrower than the fourth width W4 of the fourth portion 322 thereof, an edge of the fourth portion 322 of the second side wall 320 of the cap plate 300 and the edge of the first side wall 220 of the case 200 are positioned on the same imaginary vertical line (VL) in the vertical direction (Y).

That is, the outermost edge of the second side wall 320 of the cap plate 300 in the horizontal direction (X) and the outermost edge of the first side wall 220 of the case 200 in the horizontal direction (X) are positioned on the same imaginary vertical line VL, so that interference with other components of a device in which the rechargeable battery 1002 is installed is suppressed by the volume of the rechargeable battery 1002 itself.

The length of the second side wall 320 of the cap plate 300 may be longer in the vertical direction (Y) than the length of the first side wall 220 of the case 200, but is not limited thereto.

An end portion of the third portion 321 of the second side wall 320 of the cap plate 300 contacts the bottom portion of the case 200, so that the cap plate 300 has the same polarity as the case 200 and the first electrode 110. The first side wall 320 of the cap plate 300 may simply contact the case 200, but is not limited thereto, and the second side wall 320 of the cap plate 300 may be coupled to the case 200 by welding or the like.

The first side wall 220 of the case 200 overlaps the third portion 321 of the second side wall 320 of the cap plate 300 in the horizontal direction (X), and does not overlap the fourth portion 322 of the second side wall 320 in the horizontal direction (X). The edge of the first side wall 220 of the case 200 and the edge of the fourth portion 322 of the second side wall 320 of the cap plate 300 are positioned on the same imaginary vertical line VL in the vertical direction (Y).

A length of the first side wall 220 of the case 200 may be shorter in the vertical direction (Y) than a length of the second side wall 320 of the cap plate 300, but is not limited thereto.

The first side wall 220 of the case 200 and the third portion 321 of the second side wall 320 of the cap plate 300 are bonded by the first bonding layer 500, but are not limited thereto, and the first side wall 220 of the case 200 and the second side wall 320 of the cap plate 300 may be bonded by various bonding materials.

As described above, in the rechargeable battery 1002 according to another embodiment, the first side wall 220 of the case 200 in which the electrode assembly 100 is accommodated overlaps the second side wall 320 of the cap plate 300 covering the outer area of the opening 210 in the horizontal direction (X), the first side wall 220 and the second side wall 320 are bonded by the first bonding layer 500, and the central area of the opening 210 is covered by the terminal plate 400 bonded to the cap plate 300, so that the opening 210 of the case 200 in which the electrode assembly 100 is accommodated is completely sealed by the cap plate 300, the terminal plate 400, the first bonding layer 500, and the second bonding layer 600, thus the close and seal preservation ability for the electrode assembly 100 and the electrolyte positioned inside the case 200 is improved.

That is, the rechargeable battery 1002 with improved close and seal preservation ability for the electrode assembly positioned therein is provided.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS electrode assembly 100, case 200, first side wall 220, cap plate 300, second side wall 320, terminal plate 400, first bonding layer 500, second bonding layer 600

The invention claimed is:

1. A rechargeable battery comprising:
an electrode assembly including a first electrode, a second electrode, and a separator disposed between the first electrode and the second electrode;
a case that is connected to the first electrode to accommodate the electrode assembly, and includes an opening exposing the electrode assembly and a first side wall forming the opening;
a cap plate that is coupled to the case to cover an outer area of the opening, and includes a through-hole exposing a central area of the opening and a second side wall overlapping the first side wall in a horizontal direction;
a terminal plate that is connected to the second electrode and the cap plate and has an entirely flat outer surface completely covering the through-hole, the terminal plate comprising a flange portion on an outer surface of the cap plate facing away from the electrode assembly to cover the through-hole and a protrusion extending from the flange portion toward the electrode assembly;
a first bonding layer that is positioned between the first side wall of the case and the second side wall of the cap plate, and bonds the first side wall and the second side wall, and
a second bonding layer positioned between the cap plate and the flange portion and insulation-bonding the cap plate and the flange portion,
wherein the second bonding layer is separated from the protrusion, and
wherein the first side wall directly contacts the cap plate at a point offset from the second side wall along a radial direction of the electrode assembly.

2. The rechargeable battery of claim 1, wherein the second side wall covers the first side wall in the horizontal direction.

3. The rechargeable battery of claim 2, wherein a length of the first side wall is longer than that of the second side wall.

4. The rechargeable battery of claim 2, wherein a width in the horizontal direction of a first portion of the first side wall overlapping the second side wall in the horizontal direction is narrower than a width in the horizontal direction of a second portion of the first side wall that does not overlap the second side wall in the horizontal direction.

5. The rechargeable battery of claim 4, wherein the first portion of the first side wall is in contact with the cap plate.

6. The rechargeable battery of claim 4, wherein an edge of the second portion of the first side wall and an edge of the second side wall are positioned on the same vertical line.

7. The rechargeable battery of claim 1, wherein the protrusion passes through the through-hole from the flange portion.

8. The rechargeable battery of claim 7, wherein the electrode assembly further includes a first electrode tab extending from the first electrode to be coupled to the case, and a second electrode tab extending from the second electrode to be coupled to the protrusion of the terminal plate.

9. The rechargeable battery of claim 1, wherein the case and the cap plate have the same polarity as the first electrode, and the terminal plate has the same polarity as the second electrode.

10. The rechargeable battery of claim 1, wherein the first bonding layer is bonded by thermal fusion.

* * * * *